| United States Patent [19] | [11] Patent Number: 5,057,248 |
| Matsuda et al. | [45] Date of Patent: Oct. 15, 1991 |

[54] METHOD FOR PRODUCTION OF POLYMERIC NONLINEAR OPTICAL MATERIAL

[75] Inventors: Hiroo Matsuda; Shuji Okada; Hachiro Nakanishi; Masao Kato, all of Tsukuba, Japan

[73] Assignee: Agency of Industrial Science & Technology, Ministry of International Trade & Industry, Tokyo, Japan

[21] Appl. No.: 313,448

[22] Filed: Feb. 22, 1989

[30] Foreign Application Priority Data

Jun. 29, 1988 [JP] Japan ................................ 63-161915

[51] Int. Cl.$^5$ ................................................ F21V 1/00
[52] U.S. Cl. ................................... 252/582; 252/586
[58] Field of Search ............... 252/582, 586; 350/357; 428/690, 691

[56] References Cited

U.S. PATENT DOCUMENTS 4,231,641 11/1980 Randin ................................. 350/357
4,725,513 2/1988 Eguchi et al. ....................... 428/690

OTHER PUBLICATIONS

Extended Abstract 1985 Fall meeting of MRS, pp. 11-13; K. D. Singer, et al.
Polymer, 1987, vol. 28, Apr. (Conference issue), pp. 533-542; D. R. Ulrich.

*Primary Examiner*—Robert L. Stoll
*Assistant Examiner*—Shean C. Wu
*Attorney, Agent, or Firm*—Oblon, Spivak, McClelland, Maier & Neustadt

[57] ABSTRACT

A polymeric nonlinear optical material is produced by mixing a polyelectrolyte solution with an ionic pigment solution thereby obtaining a solution containing a composite of said polyelectrolyte and said ionic pigment, and separating said composite from said solution.

10 Claims, No Drawings

METHOD FOR PRODUCTION OF POLYMERIC NONLINEAR OPTICAL MATERIAL

BACKGROUND OF THE INVENTION

1. Field of the Invention

This invention relates to a method for the production of a polymeric nonlinear optical material. More particularly, this invention relates to a method for the production of a polymeric nonlinear optical material, characterized by forming a composite essentially consisting of a polyelectrolyte and an ionic pigment.

2. Prior Art Statement

Nonlinear optical materials have been widely utilized as optical wavelength modulating elements and optical shutters, for example, in lasers.

Recently, nonlinear optical materials have been attracting attention in various fields as for usefulness in the high-speed optical switching elements, optical logical gates, and optical transistors which are indispensable for the realization of an optical computer, and the search for new materials of this type is being vigorously pursued.

Nonlinear optical materials currently in practical use include such inorganic crystals as potassium dihydrogen phosphate (KDP) and lithium niobate (LiNbO$_3$) Further, such organic crystals as urea, p-nitroaniline (PNA), 2-methyl-4-nitroaniline (MNA), cyanine pigment, and polydiacetylene are also known as nonlinear optical materials.

According to an article reported in the June (1981) issue of "IEEE Spectrum, pages 26–33," organic materials generally exhibit stronger nonlinear optical effect than inorganic crystals, exhibit second harmonic generation (SHC) and third harmonic generation (THG) coefficients approximately 10 to 100 times those of inorganic crystals, and produce optical responses at speeds approximately 1,000 times as high as those of the inorganic crystals. They are known to possess large threshold values for optical injury.

The qualities which the nonlinear optical materials are required to possess are optical homogeneity, transparency, and high fabricability including high film-forming property for conversion into actual component parts as well as large nonlinear optical susceptibilities.

In the conventional development of nonlinear optical materials, the method which comprises growing a large single crystal and cutting an optically transparent region out of the single crystal has been the primary technique. Recently, in consideration of the problem mentioned above, the dispersion of a pigment, i.e. a compound having a large nonlinear optical susceptibility, in a general purpose polymer and the synthesis of a polymer having an effective functional group directly joined thereto with a covalent bond are being tried. These methods, however, have a disadvantage that the nonlinear optical susceptibility is decreased because the pigment cannot be incorporated in a large proportion and the optical transparency is lost because the pigment agglomerates to give rise to minute crystals with aging. In the synthesis of a polymer having an effective functional group joined thereto, the selection of a functional group appropriate for the synthesis is attained only with difficulty and the polymer synthesized cannot be guaranteed to possess the desired film-forming property because of the problem of polymerization degree.

OBJECT AND SUMMARY OF THE INVENTION

Today, the strongest demand is for a material which retains optical transparency, possesses a large nonlinear optical susceptibility, and enjoys a satisfactory film-forming property.

The inventors have now found that, by mixing a polyelectrolyte solution with an ionic pigment solution, there is obtained a composite of the polyelectrolyte and the ionic pigment which contains the ionic pigment in a high concentration and exhibits stability over time. They have accomplished this invention based on this knowledge.

To be specific, this invention is directed to providing a method for the production of a polymeric nonlinear optical material, which is characterized by mixing a polyelectrolyte solution with an ionic pigment solution thereby forming a composite of the polyelectrolyte and the ionic pigment.

DETAILED DESCRIPTION OF THE PREFERRED EMBODIMENTS

The present invention will now be described in detail below.

The polyelectrolytes usable for this invention include polyanions and polycations. The polyanions include polystyrenesulfonic acid, polyacrylamidesulfonic acid, polyacrylic acid, and polymethacrylic acid and functional derivatives, i.e. inorganic ion salts and organic ion salts, of the compounds mentioned above, for example. They further include copolymers of such neutral polymers as polyethylene, polystyrene, polyacrylonitrile, polyacrylate, and polyethylene oxide with at least one of the compounds and the functional derivatives mentioned above. These copolymers contain their respective neutral polymers in a concentration of 95% by weight of most.

The polycations include polyvinylbenzyl ammonium, polyionene, and quaternized polyvinyl pyridine, and functional derivatives, i.e. inorganic ion salts and organic ion salts, of the compounds mentioned above. They further include copolymers of such neutral polymers as polyethylene, polystyrene, polyacrylonitrile, polyacrylate, and polyethylene oxide with at least one of the compounds and the functional derivatives mentioned above. These copolymers contain their respective neutral polymers in a concentration of 95% by weight at most.

Of the inorganic ion salts mentioned above, those which are advantageous practically are lithium, sodium, potassium, silver, etc. for cation, and chloride, bromide, iodide, tetrafluoroborate, perchlorate, bicarbonate, etc. for anion.

Of the organic ion salts mentioned above, those which are advantageous practically are tetramethylammonium, tetra-n-butylammonium, methylpyridinium, etc. for cation and acetate, benzenesulfonate, etc. for anion.

The polyelectrolyte must be capable of forming a cast membrane and, therefore, is desired to possess a molecular weight in the range of several tens of thousands to several millions, for example.

Now, the ionic pigment will be described below. The ionic pigments usable for the present invention include cationic pigments and anionic pigments. The cationic pigments include cyanine type hemicyanine, diphenylmethane type, triphenylmethane type, and acridine type pigments, and those pigments having cation residues such as ammonium residue and pyridinium residue incorporated in such neutral molecules as porphyrin, phthalocyanine, azo type pigments, stilbene type pigments, quinone type pigments, and coumarin type pigments. The anionic pigments include those pigments having such anion residues as sulfonate residues, carboxylate residues, and phosphate residues incorporated in the neutral molecules mentioned above.

Now, the method to be used for the production of a composite of polyelectrolyte and ionic pigment according to the present invention will be described.

The polyelectrolyte and the ionic pigment are each prepared in the form of a solution having a concentration approximately in the range of 1 mol/liter to 1 mmol/liter by using a solvent of relatively large polarity such as, for example, water, alcohol, tetrahydrofuran, dimethyl formamide, dimethyl sulfoxide, or a mixture thereof. The composite aimed at is obtained immediately after the two resultant solutions are mixed. Otherwise, the composite is obtained by allowing the mixture of the two solutions to stand for several hours under application of heat at a temperature in the range of normal room temperature to some tens of degrees celsius or by adding a poor solvent to the mixture.

In the mixing mentioned above, a combination of one or more polycations with one or more anionic pigments or of one or more polyanions with one or more cationic pigments is selected. The solvent for the polyelectrolyte solution and that for the ionic pigment solution need not be identical. Any combination of solvents which causes the polyelectrolyte or the ionic pigment to precipitate should be avoided.

In the composite of the present invention, the polyelectrolyte and the ionic pigment which make up the composite are bound by the electrostatic interaction between the ion residues possessed by them. The composite, therefore, is allowed to contain the ionic pigment in a high concentration ranging from some tens to 100 mol % per ion residue of the polyelectrolyte and can be easily transformed into a cast film by being dissolved in a polar solvent such as water, alcohol, or dimethyl formamide or a solvent containing an inorganic ion such as sodium chloride or lithium chloride, an acid such as hydrochloric acid or sulfuric acid, or an alkali such as sodium hydroxide.

This cast film is optically homogeneous and transparent. Since the pigment molecules contained therein are bound in place by the electrostatic interaction, the cast film excels in isotropy and stability against aging.

Further, since the composite has a large pigment content, it possesses a large third-order nonlinear optical susceptibility.

Now, the present invention will be described more specifically below with reference to working examples. It should be noted, however, that this invention is not restricted in any way by these examples.

EXAMPLE 1

Poly(lithium styrenesulfonate) represented by the formula:

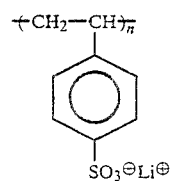

and a hemicyanine

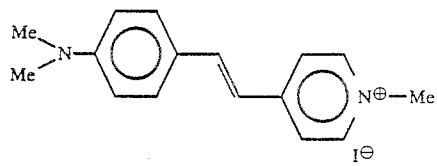

were each dissolved in a methanol:water (10:1) mixed solvent in a concentration of 0.1 mol/liter and the resultant solutions were mixed. When the red homogeneous solution consequently formed was left standing for about 3 hours, a homogeneous film-like sediment was formed on the bottom of the container. The supernatant was removed. The sediment which remained was washed several times with methanol and dried, to obtain a red solid composite consisting of polystyrenesulfonic acid and cyanine pigment. By elementary analysis, this composite was found to contain the hemicyanine pigment in a concentration of about 70 mol % per repeating unit of the polystyrenesulfonic acid. The molecular weight of this composite was estimated to be about 80,000.

This composite could be redissolved by being heated to about 50° C. in a methanol:water (10:1) mixed solvent. When the solution was cast on a quartz substrate, there was obtained a red transparent film 4.2 μm in thickness. When a pulse laser beam 1.94 μm in wavelength was projected on this film, there was observed a third harmonic component of 647 nm at an intensity about 100 times that of fused quartz. By calculation using this result, the third-order nonlinear optical susceptibility of the film was found to be on the order of $10^{-12}$ esu. When this film was left standing in the open air, it showed no discernible sign of moisture absoption or reagglomeration of pigment molecules. Thus, it proved to be a stable material capable of retaining optical homogeneity.

EXAMPLE 2

A polyionene represented by the formula:

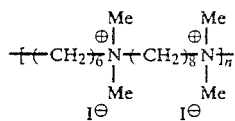

and triphenyl methane type pigment (sulforhodamine) represented by the formula:

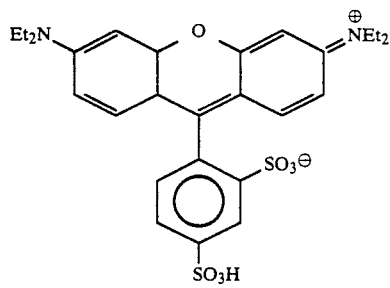

were each dissolved in methanol in a concentration of 0.01 mol/liter. The two resultant solutions were mixed, to produce a reddish orange precipitate. When this precipitate was washed several times with methanol and then dried, there was obtained an orange color composite of polyionene and sulfo-rhodamine. By elementary analysis, this composite was found to contain the sulforhodamine in a concentration of about 40 mol % per repeating unit of the polyionene.

This composite was redissolvable in water. When this solution was cast on a quartz substrate, there was formed a yellow transparent film 1.5 μm in thickness. When a pulse laser beam 1.80 μm in wavelength was projected on this film, there was observed a third harmonic component of 600 nm at an intensity about 50 times that of fused quartz. By calculation using this result, the film was found to possess a third-order nonlinear optical susceptibility on the order of $10^{-12}$ esu. When this film was left standing in the air at normal room temperature, it showed no discernible sign of absorption of moisture or reagglomeration of pigment molecules. Thus, it proved to be a stable material retaining optical homogeniety.

EXAMPLE 3

A polyanion represented by the formula:

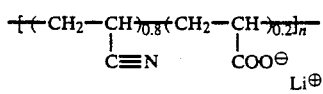

and an azo pigment represented by the formula:

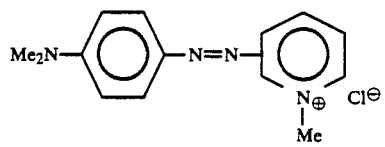

were each dissolved in methanol in a concentration of 0.05 mol/liter. When the two resultant solutions were mixed, there was formed a light yellow homogeneous solution. When 50 ml of this solution and about 20 ml of water added thereto were left standing, a precipitate was formed. This precipitate was washed several times with a methanol:water (1:1) mixed solvent and dried. Consequently, there was obtained a yellow composite of polyanion and azo pigment. By elementary analysis, this composite was found to contain the azo type pigment in an equal molar amount as the carboxylate residue of the polyanion. The molecular weight of the composite was about 300,000.

This composite was redissolvable in methanol. When the solution was cast on a quartz substrate, there was obtained a yellow transparent film 0.5 μm in thickness. When a pulse laser beam 1.50 μm in wavelength was projected on this film, there was observed a third harmonic component of 500 μm at an intensity about 30 times that of fused quartz. By calculation using this result, the film was found to possess a third-order nonlinear optical susceptibility on the order of $10^{-12}$ esu. When this film was left standing in the air at room temperature, it showed no discernible sign of absorption of moisture or reagglomeration of pigment molecules. Thus, it proved to be a stable material retaining optical homogeneity.

EXAMPLE 4

When a methanol solution containing polyvinyl pyridine in a concentration of 20 mmols/liter and an aqueous solution containing an anionic phthalocyanine represented by the formula

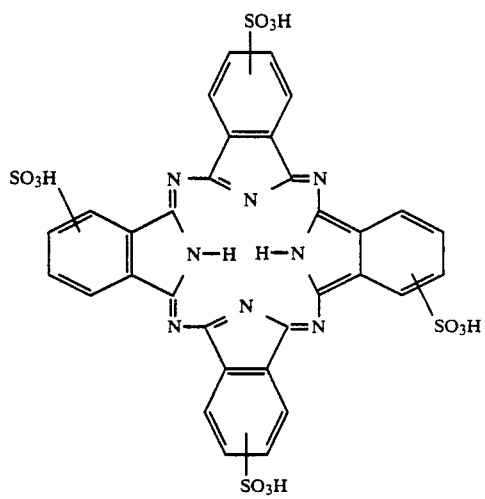

in a concentration of 10 mmols/liter were mixed, they immediately formed a blue precipitate. When the precipitate was washed several times with water and then dried, a blue composite of polyvinyl pyridine and the phthalocyanine was obtained. By elementary analysis, this composite was found to contain the phthalocyanine in a concentration of 50 mol % per repeating unit of the polyvinyl pyridine.

This composite could be redissolved in a mixed solvent consisting of a dilute aqueous solution of sulfuric acid and methanol. When the resultant solution was cast on a quartz substrate and then thoroughly washed with water, there was obtained a blue transparent film 2.0 μm in thickness. When a pulse laser beam 2.10 μm in wavelength was projected on this film, there was observed a third harmonic component of 700 μm at an intensity about 300 times that of fused quartz. By calculation using this result, the film was found to possess a third-order nonlinear optical susceptibility on the order of $10^{-12}$ esu. When this film was left standing in the air at room temperature, it showed no discernible sign of absorption of moisture of reagglomeration of pigment molecules. Thus, it proved to be a stable material retaining optical homogeneity.

The method of this invention produces a polymeric substance possessing optical transparency and excelling in nonlinear optical property, stability against aging, and moldability by utilizing the fact that ionic compounds readily form a composite owing to their electrostatic interaction, allowing the optical transparency due to film-forming property and optical isotropy to rely on the quality of the polyelectrolyte, and allowing the magnitude of the nonlinear optical property to rely on the ionic pigment. By virtue of the third-order nonlinear optical effect, the polymeric substance finds utility aptly as a material for optical wavelength transformer elements, optical shutters, high-speed switching elements, optical logical gate elements, space data elements, etc.

What is claimed is:

1. A method for the production of a polymeric nonlinear optical material, comprising the steps of:

mixing (I) a polyelectrolyte solution containing at least one polyanion selected from the group consisting of (a) polystyrenesulfonic acid, (b) polyacrylamide sulfonic acid, (c) polyacrylic acid, (d) polymethacrylic acid, (e) inorganic or organic ion salts of said acids (a), (b), (c) and (d), and (f) copolymers of polyethylene, polystyrene, polyacrylonitrile, polyacrylae or polyethylene oxide at a maximum concentration of 95% by weight with at least one of said acids and said inorganic or organic ion salts (a), (b), (c), (d) or (e), with (II) an ionic pigment solution containing at least one member selected from the group consisting of cation pigments having a cation residue incorporated in cyanine pigments, hemicyanine pigments, diphenylmethane pigments, triphenyl methane pigments, acridine pigments, porphyrin, phthalocyanine, azo pigments, stilbene pigments, quinone pigments and coumarin pigments, thereby forming a solution containing a composite of said polyelectrolyte and said ionic pigment; and separating said composite from said solution.

2. A method for the production of a polymeric nonlinear optical material, comprising the steps of:

mixing (I) a polyelectrolyte solution containing at least one poycation selected form the group consisting of (a) polyvinylbenzyl ammonium, (b) polyionene, (c) quaternized polyvinyl pyridine, (d) inorganic or organic ion salts of said components (a) (b) or (c), and (e) copolymers of polyethylene, polystyrene, polyacrylonitrile, polyacrylate or polyethylene oxide at a maximum concentration of 95% by weight with at least one of said compounds (a), (b), (c) or (d), with (II) an anionic pigment solution containing at least one member selected from the group consisting of anion pigments having an anion residue incorporated in cyanine pigments, hemicanine pigments, diphenylmethane pigments, triphenyl methane pigments, acridine pigments, porphyrin, phthalocyanine, azo pigments, stilbene pigments, quinone pigments and coumarin pigments, thereby forming a solution containing a composite of said polyelectrolyte and said anionic pigment; and separating said composite from said solution.

3. A method according to claim 1, wherein said cation residue is one member selected from class consisting of ammonium residue and pyridinium residue.

4. A method according to claim 2, wherein said anion residue is at least one member selected form the group consisting of sulfonate residue, carboxylate residue, and phosphate residue.

5. A method according to claim 1, wherein said polyelectrolyte solution is a solution containing in a solvent of relatively large polarity of polyelectrolyte in a concentration in the range of 1mol to 1 mmol/liter.

6. A method according to claim 1, wherein said ionic pigment solution is a solution containing in a solvent of relatively large polarity an ionic pigment in a concentration int he range of 1 mol to 1 mmol/liter.

7. A method according to claim 2, wherein said polyelectrolyte solution is a solution containing in a solvent of relatively large polarity of polyelectrolyte in a concentration in the range of 1 mol to 1 mmol/liter.

8. A method according to claim 2, wherein said ionic pigment solution is a solution containing in a solvent of relatively large polarity an anionic pigment in a concentration in the range or 1 mol to 1 mmol/liter.

9. A method according to claim 1, wherein the inorganic salts are a chloride, bromide, iodide, tetraflouroborate, perchlorate or bicarbonate, and the organic salts are acetate or benzenesulfonate.

10. A method according to claim 2, wherein the inorganic salts are of lithium, sodium, potassium or silver, and the organic salts are tetramethylammonium, tetra-n-butyl ammonium or methylpyridinium.

* * * * *